United States Patent
Lee

(10) Patent No.: US 7,194,256 B2
(45) Date of Patent: Mar. 20, 2007

(54) METHOD OF CREATING INDIVIDUAL INFORMATION INCLUDING CALL LOG AND METHOD USING THE CREATED INFORMATION

(75) Inventor: Hyeon-Wook Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 179 days.

(21) Appl. No.: 10/926,908

(22) Filed: Aug. 26, 2004

(65) Prior Publication Data

US 2005/0096092 A1 May 5, 2005

(30) Foreign Application Priority Data

Oct. 31, 2003 (KR) .................. 10-2003-0076672

(51) Int. Cl.
*H04M 3/00* (2006.01)
(52) U.S. Cl. .................. 455/418; 455/412.1; 455/564; 709/224; 709/223; 370/252
(58) Field of Classification Search ............... 455/564, 455/412.1, 418; 709/224, 223; 370/252
See application file for complete search history.

(56) References Cited

U.S. PATENT DOCUMENTS

| | | | |
|---|---|---|---|
| 7,007,085 B1* | 2/2006 | Malik | 709/224 |
| 2002/0022473 A1* | 2/2002 | Takagi et al. | 455/405 |
| 2002/0128036 A1* | 9/2002 | Yach et al. | 455/552 |
| 2003/0198323 A1* | 10/2003 | Watanabe | 379/88.21 |
| 2004/0131133 A1* | 7/2004 | Charney et al. | 375/334 |

\* cited by examiner

*Primary Examiner*—Danh Cong Le
(74) *Attorney, Agent, or Firm*—The Farrell Law Firm

(57) ABSTRACT

A method of creating individual information including a call log is provided. After the individual information is created through a mobile terminal, determining an operation mode of the mobile terminal if storing of the individual information is requested. Inserting a current call log into the individual information if the operation mode is a call mode. Storing the individual information with the call log inserted therein. Thus placing the call log in an organic conjunction with the individual information. Since automatic dialing and transmission of a short message or an e-mail can be carried out using the individual information, the mobile terminal becomes more user-friendly and the utilization of individual information stored in the mobile terminal is increased.

12 Claims, 8 Drawing Sheets

METHOD OF CREATING INDIVIDUAL INFORMATION INCLUDING CALL LOG AND METHOD USING THE CREATED INFORMATION

PRIORITY

This application claims priority under 35 U.S.C. § 119 to an application entitled "Method of Creating Individual Information Including Call Log and Method of Using the Created Information" filed in the Korean Intellectual Property Office on Oct. 31, 2003 and assigned Serial No. 2003-76672, the contents of which are incorporated herein by reference.

BACKGROUND OF THE INVENTION

1. Field of the Invention

The present invention relates generally to a method of creating individual information including a call log and a method of using the created information in a mobile terminal, and in particular, to a method of creating individual information including a call log and a method of using the created information in a mobile terminal capable of creating individual information, e.g., a smart phone.

2. Description of the Related Art

A smart phone is a mobile terminal that combines portable phone and PDA (Personal Digital Assistant) functions. In general, the smart phone separately manages a call log and generates individual information, e.g., memo storing, voice recording, etc. The individual information refers to all information that a user creates, such as a text message, a voice message, etc. Therefore, to insert a particular call log in individual information while creating the individual information, a smart phone user manually searches for the call log and attaches it to the individual information. The call log, e.g., called/calling party, call type and call duration time, is stored in a phone book, it has a limited use of redialing.

FIG. 1 illustrates an interactive relationship between internal blocks in a typical mobile terminal 10. Referring to FIG. 1, the mobile terminal 10 comprises a storage 11 for storing phone numbers therein, a call unit 13 for controlling call connections, a call register 15 for managing call logs, and an information generator 17 for generating individual information.

As noted from FIG. 1, there is no interaction between the information generator 17 and the other blocks, while there are interactions among the storage 11, the call unit 13, and the call register 15.

For example, the call unit 13 interacts with the storage 11 by controlling a call connection using a phone number stored in the storage 11. The call unit 13 also interacts with the call register 15 by recording call information about a call connection in the call unit 13, and the call register 15 interacts with the storage 11 by retrieving information, e.g., phone numbers, from the storage 11 to record the call information.

On the other hand, because the information generator 17 independently operates with no interaction with the other blocks, when a user requests storing individual information, e.g., a memo, during a call, the information generator 17 simply creates the requested individual information and stores it. For example, the information generator 17 cannot store the requested individual information together with the stored call recording related to the individual information. The utilization of the individual information can be increased by storing the individual information together with any of the information related to the individual information, such as a call log. If the user-requested individual information is created during a call, the individual information is utilized more by storing it together with a call log for the call.

Traditionally, however, the user must enter the call information manually. If the user wants to store the call information while creating the individual information using a memo function of the mobile terminal 10, he/she must discontinue the memo function, search for the stored call information, memorize it, and then resume the memo function. Then, the user must enter the memorized call information manually. Therefore, because of such lengthy and cumbersome procedure, the mobile terminal 10 cannot use the individual information in conjunction with the call log.

SUMMARY OF THE INVENTION

An object of the present invention is to substantially solve at least the above problems and/or disadvantages and to provide at least the advantages below. Accordingly, an object of the present invention is to provide a method of automatically using individual information in conjunction with a call log in a mobile terminal, thereby offering convenience to a user.

Another object of the present invention is to provide a method for increasing the utilization of stored individual information through an organic conjunction between the individual information and its related call log in a mobile terminal.

The above objects are achieved by providing a method of creating individual information including a call log and of using the individual information.

According to one aspect of the present invention, in a method of creating individual information including a call log, the individual information is created through a mobile terminal. The call log associated with the individual information is inserted into the individual information, automatically and/or by user selection. The individual information with the call log inserted therein is stored.

According to another aspect of the present invention, in a method of creating individual information including a call log, upon request for creation of individual information through a mobile terminal, a call log to be inserted in the individual information is selected and temporarily stored. The individual information is created according to information inputted by a user, the call log is inserted in the individual information, and the individual information together with the call log is stored.

According to a further aspect of the present invention, in a method of using individual information including a call log, if individual information including a call log is selected among information stored in a mobile terminal, the individual information is displayed together with a service menu corresponding to the individual information. A service function is performed using the call log according to a user selection in the service menu. The service function may include automatic dialing, message transmission, e-mail transmission, and directory read/amend actions.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
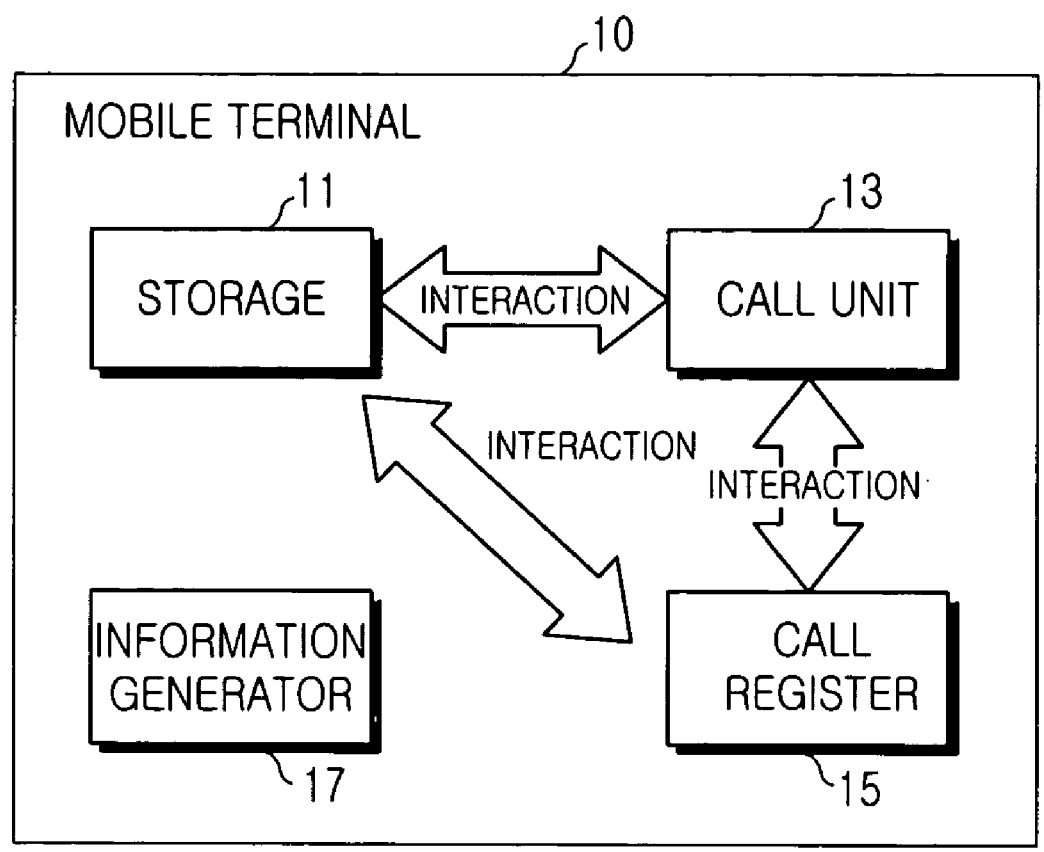
FIG. 1 is a diagram illustrating an interactive relationship between internal blocks in a typical mobile terminal.
Figure 2:
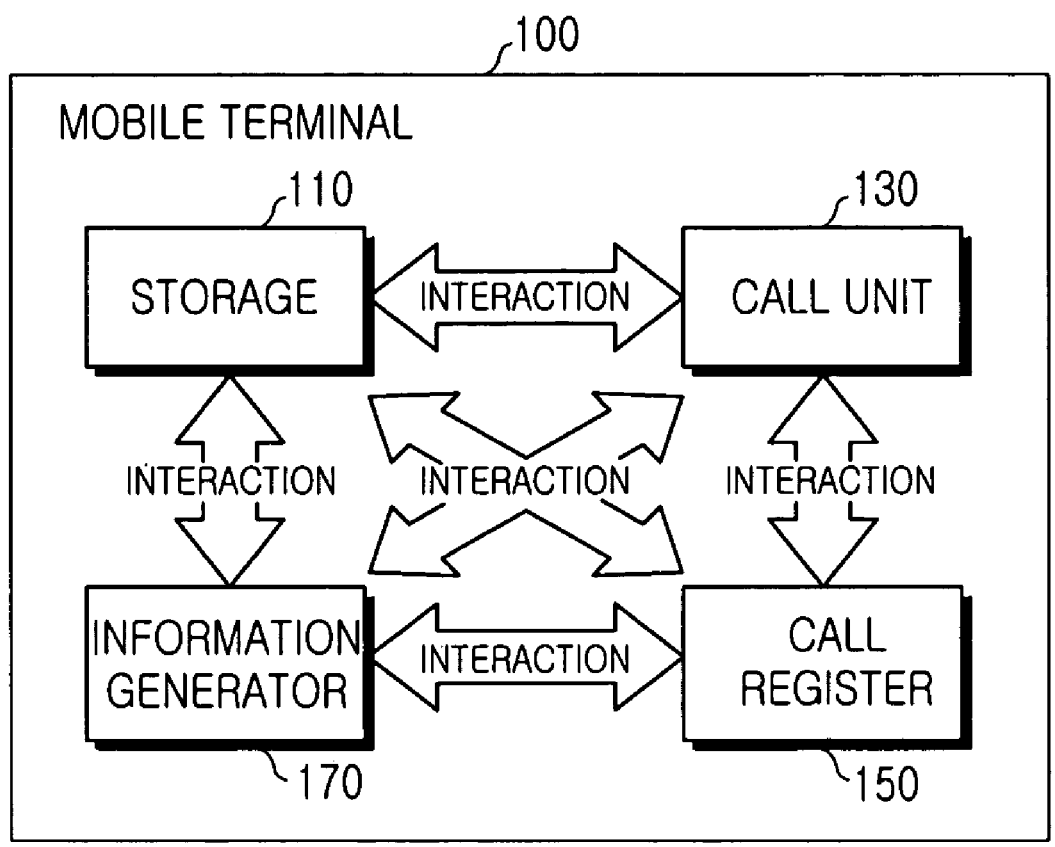
FIG. 2 is a diagram illustrating an interactive relationship between internal blocks in a mobile terminal according to an embodiment of the present invention.

FIG. 2 illustrates an interactive relationship between internal blocks in a mobile terminal according to an embodiment of the present invention. Referring to FIG. 2, a mobile terminal 100 comprises a storage 110 for storing phone numbers therein, a call unit 130 for controlling call connections, a call register 150 for managing call logs, and an information generator 170 for generating individual information such as text or voice. As noted from FIG. 2, there are interactions among the blocks 110, 130, 150 and 170. This is possible by storing individual information together with a user-desired call log, e.g., the present call log or a user-selected call log, in creating the individual information. A method of creating individual information including a call log and using the individual information will be described later.

Figure 3A:
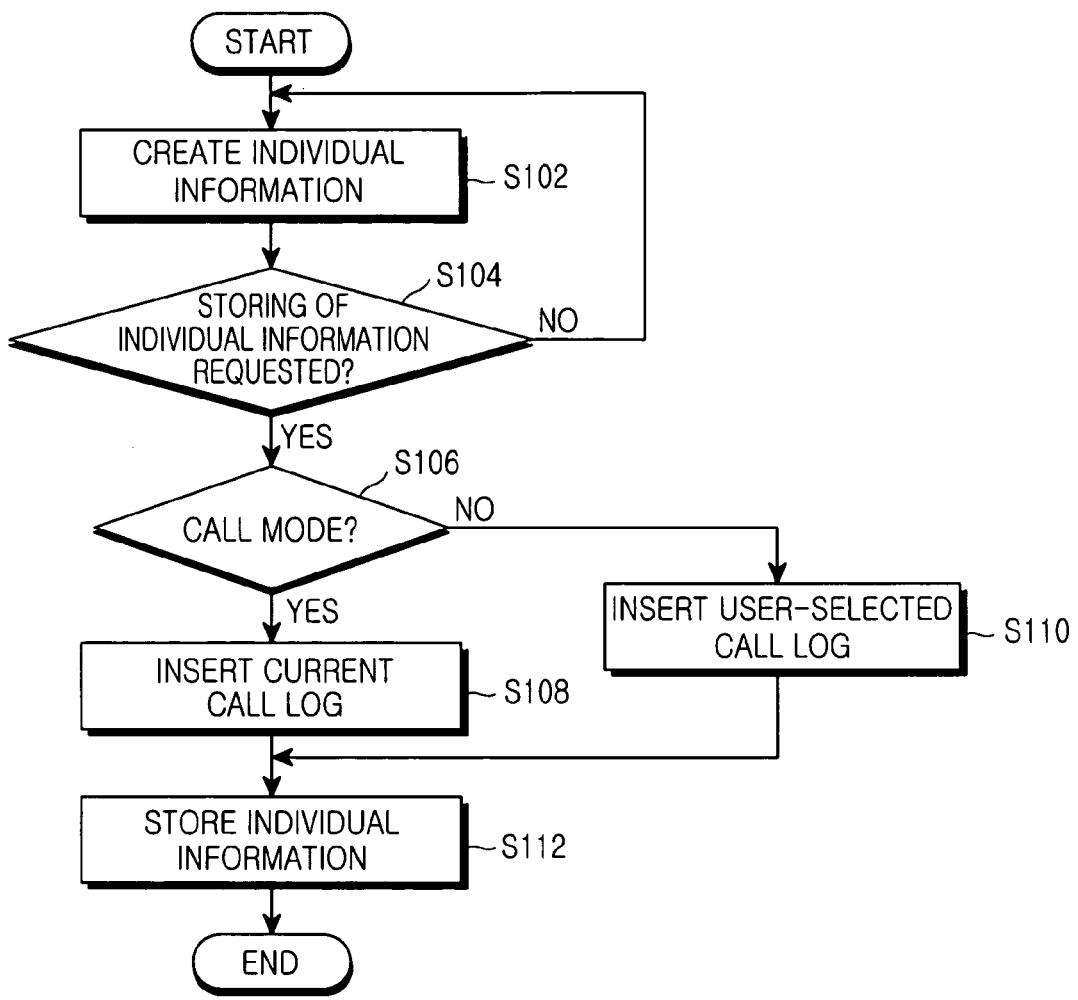
FIGS. 3A and 3B are flowcharts illustrating individual information creating methods according to embodiments of the present invention.
Figure 3B:
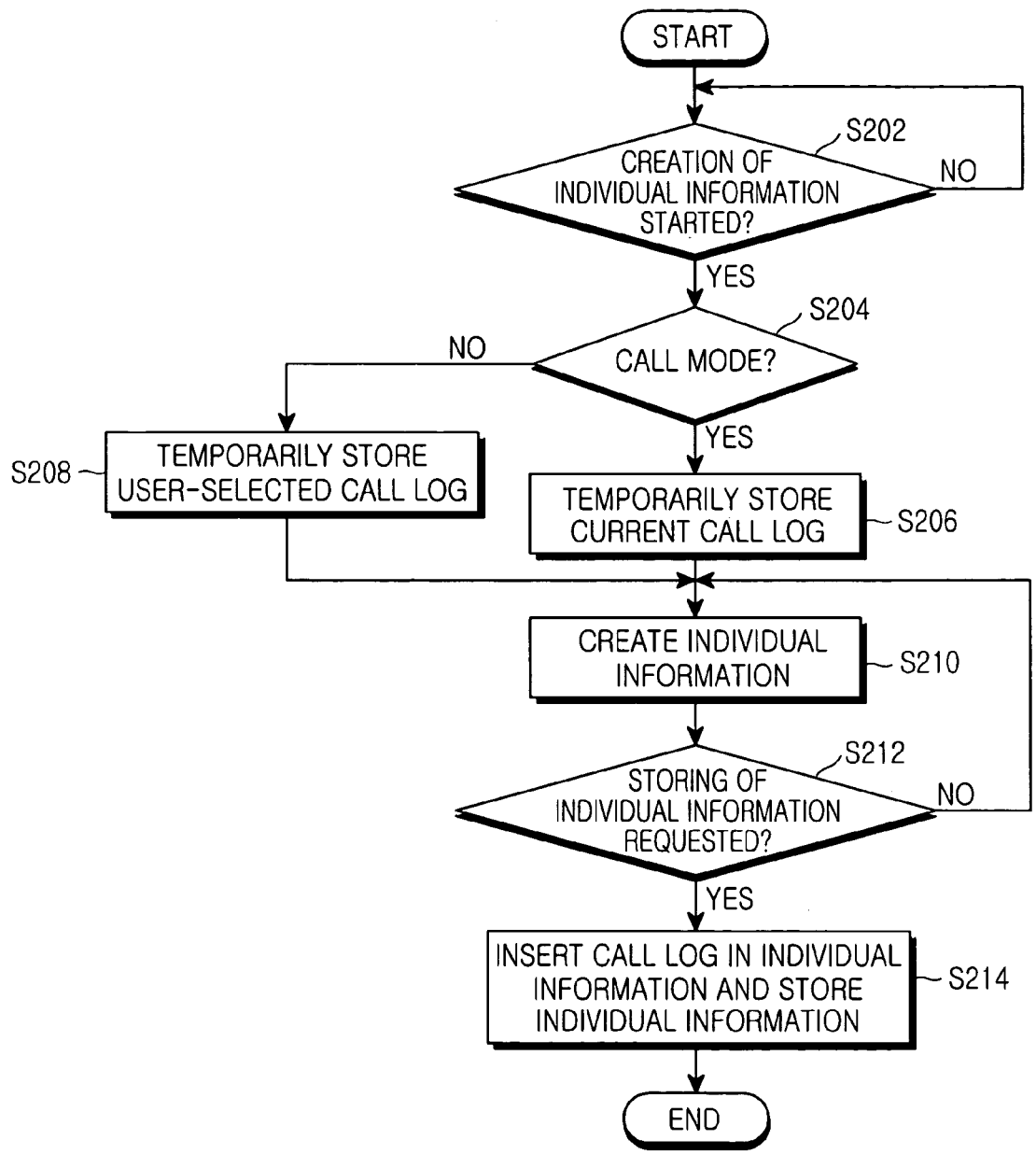

FIGS. 3A and 3B are flowcharts illustrating methods of creating individual information, particularly methods of inserting a call log in individual information while creating the individual information according to the first and second embodiments of the present invention. In the procedure illustrated in FIG. 3A, the call log is inserted after the individual information is created, whereas in the procedure illustrated in FIG. 3B, the call log is temporarily stored before the individual information is generated.

Referring to FIG. 3A, after a user creates predetermined individual information such as a memo or voice recording through a smart phone (hereinafter, referred to as a terminal) in step S102, he/she requests storing of the individual information in step S106. The mode of the terminal is decided in step S104. That is, in step S104 it is determined whether the user is conducting a call (call mode) or the terminal is in a waiting state (idle mode). If the terminal adopts the process of creating individual information and storing it in real time, step S104 can be omitted. Such a terminal creates the individual information and stores it a predetermined time later. If the terminal is in a call mode, as determined in step S106, a current call log is inserted in the created individual information in step S108. Preferably, the current call log is inserted in the individual information after the call is over. On the other hand, if in step S106 it is determined that the terminal is in the idle mode, a call log selected by the user among previously stored call logs is inserted in the individual information in step S110.

It can be further contemplated that the step of determining whether to insert the current call log or a previous stored call log in the individual information and inserting a call log selected by the user in the individual information is further included in the call mode. The call log inserted in steps S108 and S110 may include information about the other party to a call, a call start time, a call duration, and a call type, e.g., incoming or outgoing.

In step S112, the individual information including the call log is stored in a predetermined area, e.g., a memory 110 (FIG. 2) of the terminal.

Steps S108 or S110 can be omitted according to a user's selection. For example, before the current call log or the user-selected call log is inserted, the user may be asked whether the call log should be inserted, and if the answer is negative, only the individual information is stored without inserting the call log in the individual information.

Referring to FIG. 3B, when a user decides to create predetermined individual information such as a memo or a voice recording through a terminal in step S202, then in step S204, the terminal determines its mode before creating the individual information.

If the terminal is in a call mode, it temporarily stored a current call log in step S206. On the other hand, if the terminal is in an idle mode, the terminal temporarily stores a call log selected by the user in step S208. As stated above with reference to FIG. 3A, the call log may include information regarding the other party to a call, a call start time, a call duration, and a call type, e.g., incoming or outgoing. Preferably, the current call log is inserted in the individual information after a call. It can be further contemplated that the step of determining whether to insert the current call log or a previous stored call log in the individual information and inserting a call log selected by the user in the individual information is further included in the call mode.

Meanwhile, as the processing is carried out, the user can be asked about whether the call log should be inserted, and if the answer is positive, the call log can be temporarily stored in steps S206 or 208.

Similarly, a step of asking the user whether he/she has completed selecting a call log to be inserted in the individual information can further be included. Thus, steps S206 or S208 may be repeated until a signal indicating completion of the call log selection is received, thereby making it possible to include a plurality of call logs in one piece of individual information.

After the temporary storing of the call log, the terminal creates the individual information according to the user input in step S210 and if the user requests storing of the individual information in step S212, the terminal stores it in step S214. After the temporarily stored call log is inserted in the individual information, the individual information is stored. If the terminal adopts the process of automatically storing the individual information a predetermined time after the creation of the individual information is used, step S212 can be omitted.

Figure 4:
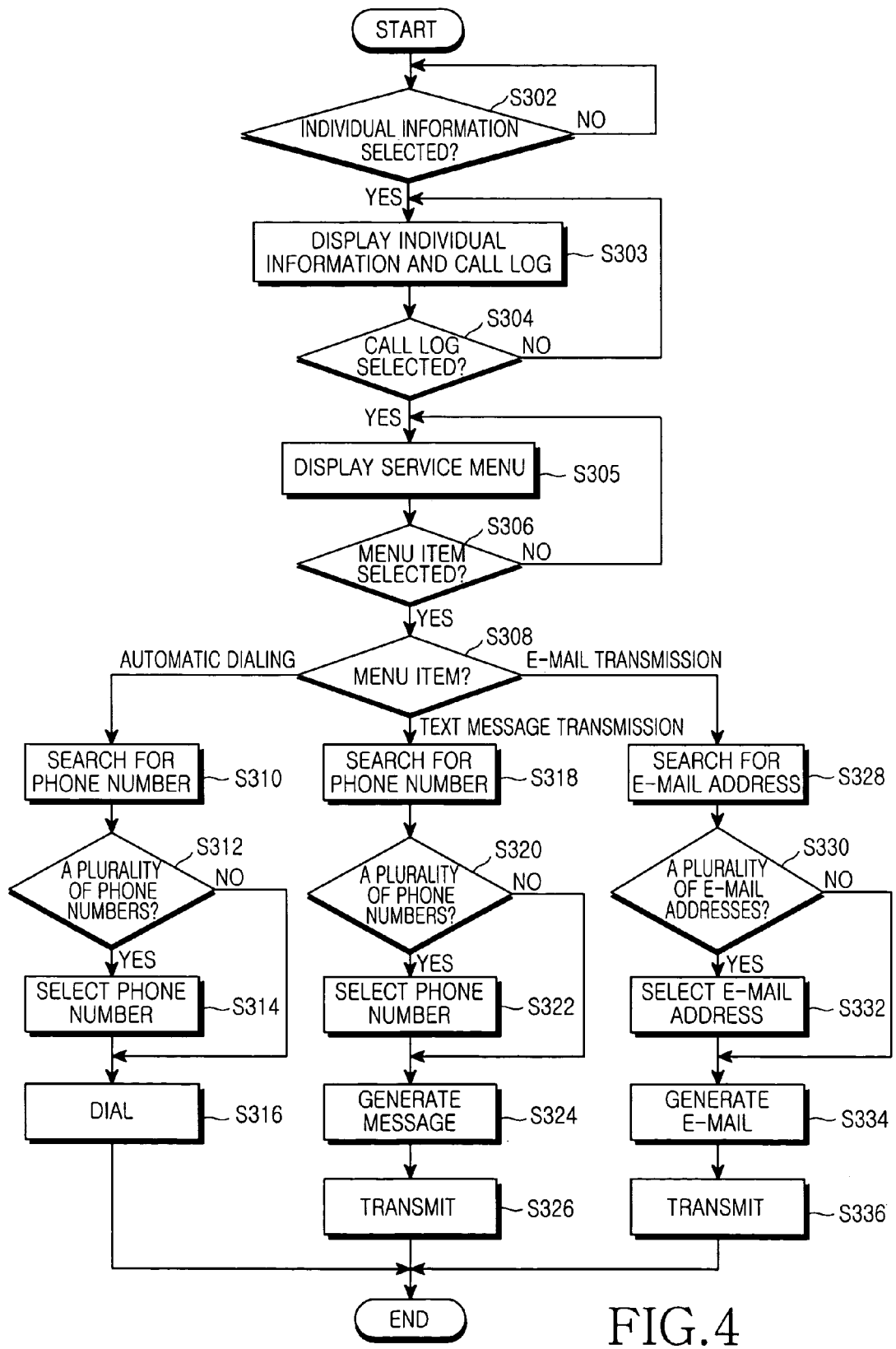
FIG. 4 is a flowchart illustrating a method of using individual information generated in the procedures illustrated in FIGS. 3A and 3B according to the embodiments of the present invention.

FIG. 4 is a flowchart illustrating a method of using individual information created according to the first and second embodiments of the present invention. The individual information created in the procedure illustrated in FIG. 3A or FIG. 3B is used in the following manner.

If in step S302 the user selects particular individual information, the terminal displays the individual information and its related call log in step S303. The call log is included in the individual information in the procedure illustrated in FIG. 3A and FIG. 3B. If the selected individual information does not include the call log, the terminal does not display the call log.

Meanwhile, it is preferable to mark individual information including a call log in an individual information list in order to allow the user to easily find out whether the selected individual information has a call log. For example, individual information including a call log may be marked with a check mark.

When the user selects the displayed call log in step S304, the terminal displays a corresponding service menu in step S305. The service menu includes all menu items serviceable according to the call log. For example, the service menu displayed in step S305 includes one or more of "auto dialing," "short message transmission," e-mail transmission," and "directory read/amend" items.

After determining in step S306 that the user has selected a menu item in the service menu, the terminal determines in step S308 what menu item was selected. Then, the terminal operates in accordance with the selected menu item. For example, if the user selects the "auto dialing" item, in step S310 the terminal searches for a phone number corresponding to the call log selected in step S304 and attempts to dial the phone number. If the user selects the "short message transmission" item, in step S318 the terminal transmits a short message containing the individual information selected in step S302 at the phone number corresponding to the call log selected in step S304. If the user selects the "e-mail transmission" item, in step S328 the terminal transmits an e-mail containing the individual information selected in step S302 at the phone number corresponding to the call log selected in step S304.

If the terminal determines that the user has selected the "auto dialing" item in step S308, in step S310 it searches for a phone number corresponding to the call log selected in step S304. If a plurality of phone numbers are detected in step S312, the terminal selects one of the phone numbers according to user selection in step S314. The terminal attempts to automatically dial the detected or selected phone number in step S316.

Meanwhile, if the user selects the "short message transmission" item, in step S318 the terminal searches for the phone number corresponding to the call log selected in step S304. If a plurality of phone numbers are detected in step S320, the terminal selects one of the phone numbers according to user selection in step S322. In step S324, the terminal generates a short message including the individual information selected in step S302 with the detected or selected phone number as a destination. That is, the individual information except for the call log becomes the contents of the short message. If the individual information excluding the call log is voice data, a voice message is generated out of the individual information. The terminal then transmits the short message in step S326.

If the user selects the "e-mail transmission" item, in step S328 the terminal searches for an e-mail address corresponding to the call log selected in step S304. If a plurality of e-mail addresses are detected in step S330, the terminal selects one of the e-mail addresses according to user selection in step S332. In step S334, the terminal generates an e-mail including the individual information selected in step S302 with the detected (or selected) e-mail address as a destination. That is, the individual information except for the call log becomes the contents of the e-mail. If the individual information excluding the call log is voice data, a voice mail is generated out of the individual information. The terminal then transmits the e-mail in step S336.

It may occur in step S328 that the call log selected in step S304 does not include an e-mail address because the e-mail address is not necessarily included in the call log. In this case, a notification message is preferably outputted, indicating that the e-mail cannot be transmitted because the e-mail address is not available, and the procedure is terminated.

In a case where the call log for the other party was not stored in a directory, the function of storing the call log for the other party in the directory and reading or amending the call log of the other party can be further provided.

Figure 5A:
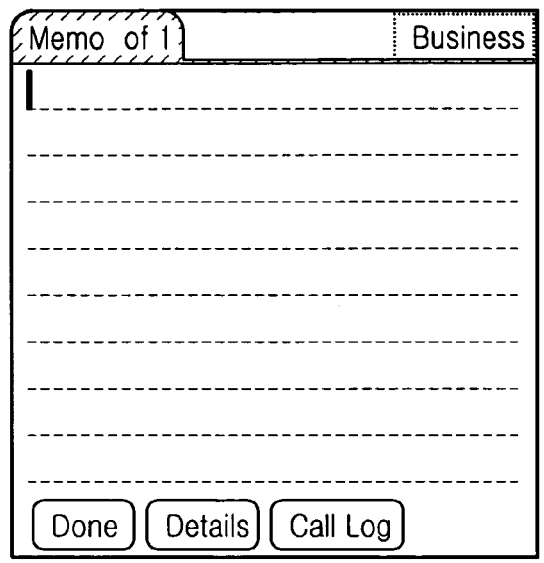
FIGS. 5A to 5D illustrate examples of displays involved with creation of individual information according to the embodiments of the present invention.
Figure 5B:
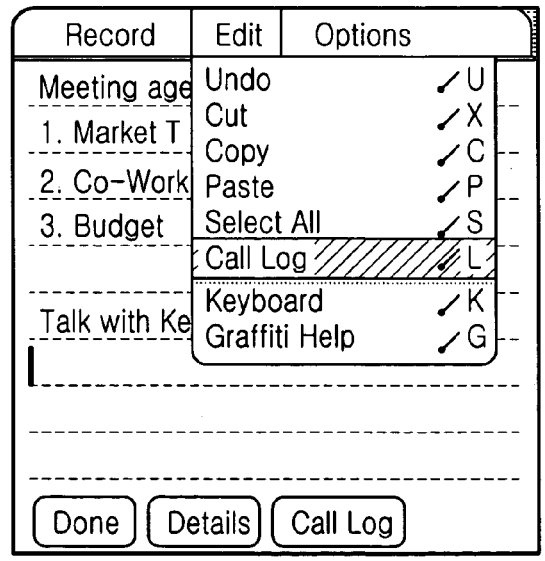
Figure 5C:
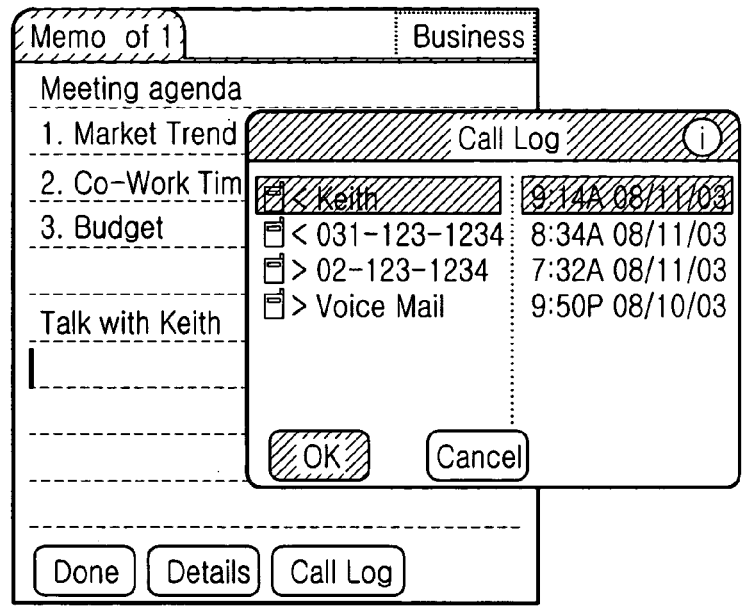

FIGS. 5A to 5D are exemplary displays involved in the creation of individual information according to the first and second embodiments of the present invention. FIG. 5A illustrates an example of a display to enable the user to create individual information, e.g., text information. FIGS. 5B and 5C illustrate exemplary displays provided when the user, after creating a memo, selects a menu or an assigned terminal button to insert a call log in the memo. In FIG. 5B, the user selects the menu item "Call Log" in the "Edit" menu, while in FIG. 5C, he selects the item "Call Log" among lower select buttons shown as "Done," "Details," and "Call Log."

Figure 5D:
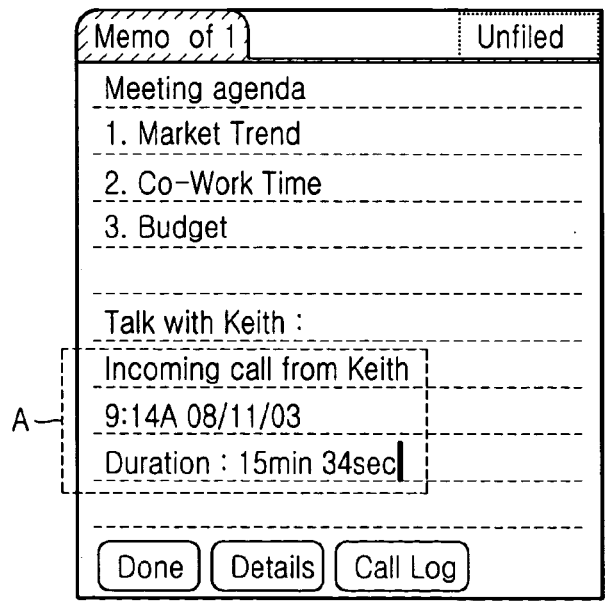

FIG. 5D illustrates an exemplary display showing user-created individual information, e.g., text information, including a user-selected Call Log denoted by reference character A. The call log includes the name "Keith" as the other party, "incoming call" as a call type, "9:14 A Aug. 11, 2003" as a call start time, and "15 min 34 sec" as a duration.

When the user selects a dialing service after selecting the individual information illustrated in FIG. 5D, the terminal searches the storage based on information about the other party in the call log, detects the phone number of the other party, and attempts to automatically dial the phone number.

Figure 6A:
FIG. 6A illustrates an example of a conventional voice memo display according to the embodiments of the present invention.

FIG. 6A illustrates an example of a conventional voice memo display. Referring to FIG. 6A, an icon indicating that individual information of interest is voice information, indicated by a picture of a person's face, and the stored information, indicated by a picture of a recording tape, only are displayed. Thus, the user does not know the length of the voice information and a call source from which it was generated until he/she listens to the voice information.

Figure 6B:
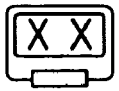
FIG. 6B illustrates an example of a voice memo display according to the embodiments of the present invention.

FIG. 6B illustrates an example of a voice memo display according to the embodiments of the present invention. Referring to FIG. 6B, a call log corresponding to voice information, denoted by reference character B is displayed in addition to an icon indicating that individual information of interest is the voice information, indicated by a picture of a person's face, and the stored information, indicated by a picture of a recording tape. Thus, the user knows the length of the voice information and a call source from which it was generated. Especially when the voice information is a recording of a call, the user can know the other party of the call.

In addition, the user can automatically dial, or transmit a text message or an e-mail using the call log.

In accordance with the present invention as described above, a call log and individual information are used in organic conjunction by inserting the call log in the individual information when creating the individual information in a mobile terminal. Because automatic dialing or transmission of a text message or an e-mail can be carried out based on the call log, user convenience is improved and the utilization of individual information stored in the mobile terminal is further increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of creating individual information including a call log, the method comprising:
   creating individual information through a mobile terminal;
   inserting a call log associated with the individual information into the individual information, wherein the inserting is performed automatically and the inserting comprises:
   (1) determining an operation mode of the mobile terminal;
   (2) inserting a current call log into the individual information if the operation mode is a call mode; and
   (3) inserting a selected previous call log into the individual information if the operation mode is not the call mode; and
   storing the individual information with the call log inserted therein.

2. The method of claim 1, wherein the step (2) further comprises the step of inserting at least one of the current call log and the selected previous call log into the individual information.

3. The method of claim 1, wherein the step (2) further comprises the step of waiting until a current call is terminated and inserting the call log into the individual information if the operation mode is the call mode.

4. The method of claim 1, wherein the step (3) further comprises the step of inserting at least one selected previous call log into the individual information.

5. The method of claim 1, wherein the call log includes at least one of an item selected from the other party to a call, call start time, duration, and call type.

6. The method of claim 1, wherein the insertion step comprises the steps of:
   asking a user about whether the call log is to be inserted; and
   determining whether to insert the call log according to an answer from the user.

7. A method of creating individual information including a call log, the method comprising:
   selecting a call log to be inserted in the individual information and temporarily storing the call log upon request for creation of individual information through a mobile terminal; and
   creating the individual information according to information input by a user, inserting the call log in the individual information, and storing the individual information with the call log, wherein the step of temporarily storing a call log comprises:
   (1) determining an operation mode of the mobile terminal;
   (2) temporarily storing a current call log if the operation mode is a call modes; and
   (3) temporarily storing a previous call log selected by the user if the operation mode is not the call mode.

8. The method of claim 7, wherein the step (2) further comprises the step of temporarily storing at least one of the current call log and the selected previous call log.

9. The method of claim 7, wherein the step (2) further comprises the step of waiting until a current call is terminated and inserting the call log into the individual information if the operation mode is the call mode.

10. The method of claim 7, wherein the step (3) further comprises the step of temporarily storing at least one of previous call logs.

11. The method of claim 7, wherein the call log includes at least one of items selected from the other party to a call, call start time, duration, and call type.

12. The method of claim 7, wherein the step of creating, inserting and storing the individual information comprises the step of:
   asking a user about whether the call log is to be inserted; and
   determining whether to insert the call log according to an answer from the user.

* * * * *